United States Patent
Meyers

(10) Patent No.: US 6,502,100 B1
(45) Date of Patent: Dec. 31, 2002

(54) METHOD AND APPARATUS FOR ACQUIRING AND STORING DATA IN ASSOCIATION WITH A MODE ANNOTATION

(75) Inventor: Stephan Meyers, Tampere (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 09/475,358

(22) Filed: Dec. 30, 1999

(51) Int. Cl.[7] ............................................. G06F 17/30
(52) U.S. Cl. ....................................................... 707/101
(58) Field of Search .................... 707/10, 101; 396/288, 396/311, 313, 318; 704/270

(56) References Cited

U.S. PATENT DOCUMENTS

| | | | |
|---|---|---|---|
| 5,799,319 A | 8/1998 | Atkins | 707/200 |
| 5,809,250 A | 9/1998 | Kisor | 709/227 |
| 5,845,161 A | * 12/1998 | Schrock et al. | 396/310 |

FOREIGN PATENT DOCUMENTS

| | | | |
|---|---|---|---|
| EP | 0865188 | | 9/1998 |
| EP | 0921700 | * | 6/1999 |
| GB | 2315954 | * | 2/1998 |

OTHER PUBLICATIONS

European Patent Office Search Report dated Nov. 7, 2001 (3pp.).*

* cited by examiner

*Primary Examiner*—Diane D. Mizrahi
*Assistant Examiner*—Apu Mofiz

(57) ABSTRACT

A method and apparatus for acquiring and storing data in association with a mode annotation is disclosed. The apparatus has a plurality of operating modes and a storage device for storing acquired data elements. In the method, one of the plurality of operating modes is selected. A mode annotation which is indicative of the selected operating mode is selected thereafter. While the apparatus is operated in the selected operating mode, one or more data elements are acquired and stored in association with the mode annotation on the storage device. The apparatus and method disclosed enables acquired data to be efficiently recalled on the basis of associated operating mode annotations.

34 Claims, 5 Drawing Sheets

PHYSICAL SENSOR STATE

| | MODE ANNOTATION | DATA ELEMENT |
|---|---|---|
| 30a | A | 1 |
| 30b | A | 2 |
| 30c | B | 3 |
| 30d | B | 4 |
| 30e | B | 5 |
| 30f | B | 6 |
| 30g | A | 7 |
| 30h | B | 8 |

| | MODE ANNOTATION | DATA ELEMENT |
|---|---|---|
| 40a | A | 1 |
| 40b | B | 2 |
| 40c | B | 3 |
| 40d | D | 4 |
| 40e | C | 5 |
| 40f | A | 6 |
| 40g | C | 7 |
| 40h | D | 8 |

METHOD AND APPARATUS FOR ACQUIRING AND STORING DATA IN ASSOCIATION WITH A MODE ANNOTATION

BACKGROUND OF THE INVENTION

1. Field of the Invention

The present invention generally relates to a method and apparatus for acquiring data and storing data automatically in association with a mode annotation. More particularly, the present invention relates to a method and apparatus in which data elements acquired by the apparatus are associated with an annotation reflecting a user set or an automatically set operating mode that the apparatus was in at the time the data was acquired. The association with the mode annotation enables efficient later data retrieval through recall via the associated mode annotation.

2. Discussion of Related Art

Many wireless communication devices enable their users to select one or more operating or user modes. For example, some wireless communication devices, such as the NOKIA Model 6110 portable phone, allow the user to define and select mode preferences, such as "general", "outdoor", "meeting", or "silent." The different mode preferences may alter the way the device sounds to alert the user about incoming messages. For example, in the "outdoor" mode, the volume of an audible alert signal may be set to its loudest setting and the phone may only allow private calls to activate the alert signal. In the "meeting" mode, the audible alert signal may be set to the quietest setting or an alternative alerting means, such as vibrations, may be employed. In this mode, it may also only provide alerts for calls from calling stations which have a calling station identification that matches an identification contained in a stored priority list, while diverting all calls from non-matching stations to the user's voice mail box.

As disclosed in published European Patent Application EP 0865188, the operating modes or functions of a portable or mobile phone can be controlled in response to sensed control parameters. Although the phone may acquire some data in the course of its operation, such acquired data is typically limited to data that assists with selection of its operating modes or functions. Communicators, such as those made by NOKIA bearing model numbers 9000 or 9110, are a form of wireless communication device combining the features of personal digital assistant (PDA) and mobile phones, thus providing enhanced functionality over mobile phones, in general. Such enhanced functionality includes the ability to collect data from data sources distributed about a global network, data which may not be relevant to its operation. In some cases, the acquisition of data may be an automatic, passive function of the communicator device or may be initiated by the user from time to time via the selection of a previously defined user mode. The passively acquired data is typically in the form of one or more records or data files.

U.S. Pat. No. 5,799,319 discloses a method for naming computer files. The disclosed method uses a computer program to generate an information screen display at a terminal. The information requested on the screen includes a prompt for a submission number. From the submission number a set is created which is intended to hold a plurality of image data files. The information is entered by a user prior to saving any images. Images are acquired and corresponding video outputs are presented to a computer where the images are digitized to generate image data sets and subsequently saved. The saved image file is assigned a file name corresponding to the submission number followed by a suffix. For each subsequent image, file saved, the suffix is automatically updated.

U.S. Pat. No. 5,809,250 discloses a method for creating and sharing replayable modules representative of a web browsing session. The disclosed method annotates entries in a session file with text, audio, video or various combinations of these.

Some advanced digital cameras allow the annotation of data after and during its capture. Annotation is performed by permitting an audio recording to be made at the time the image is acquired. Some cameras allow images to be stored in predesignated folders. Unfortunately, these annotation solutions require the user to expend energy to select particular annotations at the time of data capture or afterwards.

SUMMARY OF THE INVENTION

Accordingly, it is an object of the present invention to provide an apparatus and method that can acquire and store data so as to be associated with a mode annotation to indicate the operating mode of the apparatus at the time the data was acquired. Such mode annotations permit an organized and efficient recall of such annotated data based upon different operating modes of the apparatus. The object is accomplished, at least in part, by the method which has several steps, including: providing a data acquisition apparatus having a plurality of operating modes and a storage device for storing a data element; selecting one of the plurality of operating modes; and selecting a mode annotation which is indicative of the selected operating mode. The method also includes the steps of operating the apparatus in the selected operating mode; acquiring a data element; and storing the data element so as to be associated with the selected mode annotation on the data storage device. In one embodiment, the apparatus is equipped with a physical sensor adapted to sense a physical condition and a logical sensor adapted to sense a logical condition. In this embodiment, the operating mode is selected in response to the physical condition and the logical condition sensed by the physical and logical sensors. The mode annotation is then selected automatically to correspond to the operating mode selected.

Other objects and advantages of the present invention will become apparent to those skilled in the art from the following detailed description read in conjunction with the attached drawings and claims appended hereto.

BRIEF DESCRIPTION OF THE DRAWINGS

For a fuller understanding of the nature and objects of the invention, reference should be made to the following detailed description taken in conjunction with the accompanying drawings, in which.

BEST MODE FOR CARRYING OUT THE INVENTION

The present invention is directed to a method and apparatus for acquiring data and storing the data so as to be associated with a mode annotation. All data associated with the same mode annotation may be recalled easily based upon the associated mode annotation. The invention may be implemented in a variety of devices currently used to acquire or create storable data, such as, for example, a video camera, a mobile telephone or a portable computer.

Figure 1:
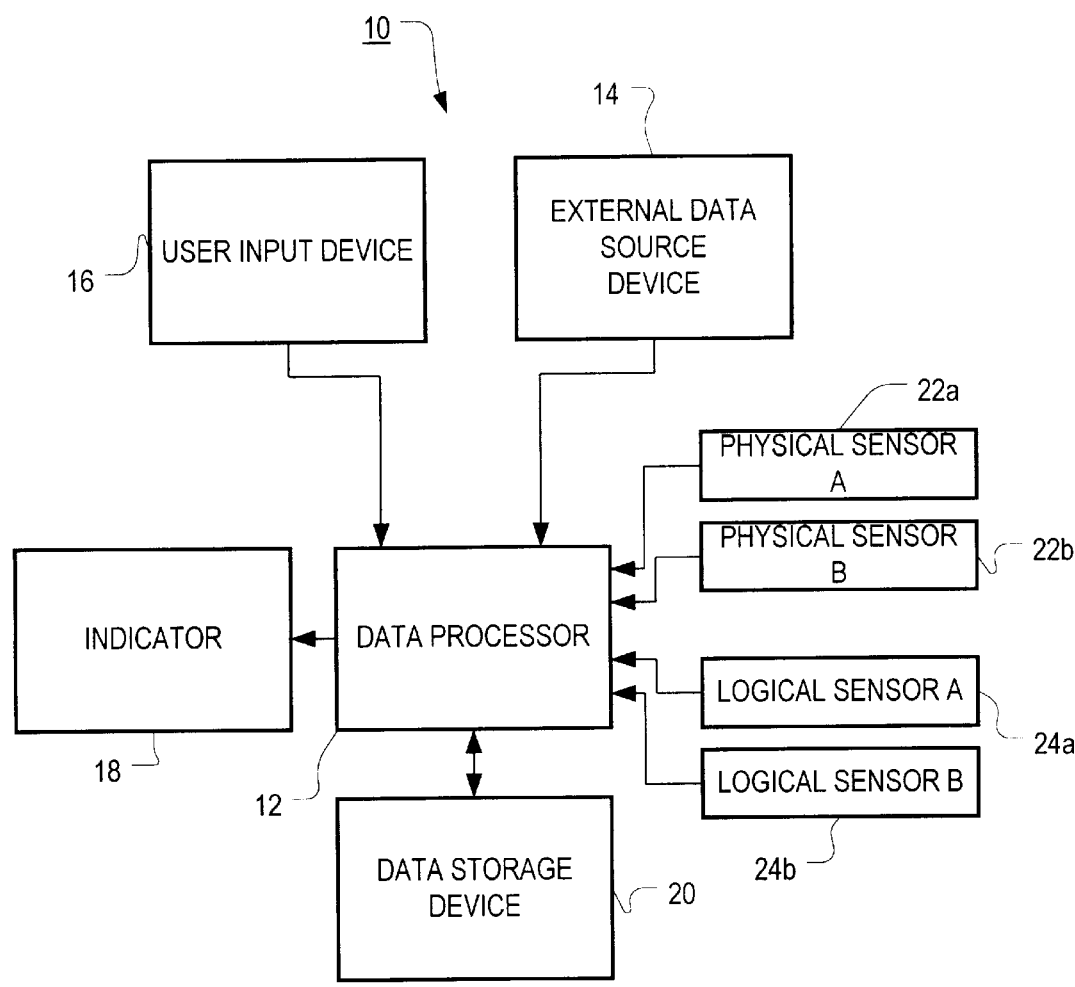
FIG. 1 is a schematic diagram of a data acquisition, annotation and storage apparatus according to the present invention.

FIG. 1 illustrates by way of a schematic diagram an apparatus 10 for acquiring, annotating and storing annotated data according to the present invention. Referring to FIG. 1, at the heart of the apparatus 10 is a data processor 12, which may be formed from any commercially available microprocessor including those manufactured and marketed by Intel, Advanced Micro Devices, Motorola, or International Business Machines, for example. Data may be supplied to or acquired by the data processor 12 from an external data source device 14 which is connected thereto. The data type from the external data source device 14 and the type of external data source device 14 itself may be wide ranging. For example, the data may represent an image acquired from a charge coupled device (CCD) external data source device 14 typically found in virtually all commercially available video cameras and digital cameras. The data may be binary data received over a local or global network via an external data source device 14 such as a network interface card. Apart from networks, the external data source device 14 may be an infrared (IR) transceiver capable of point-to-point file transfers with another IR transceiver. Those skilled in the art will now appreciate that the term "external data source device" is used in a general sense to indicate the wide ranging types of external data source devices that a user may employ to acquire data. The type of external data source device 14 employed will depend upon the type of data the user wishes to acquire.

Data may also be acquired by the apparatus 10 through data input from a user input device 16, such as keyboard, touch sensitive panel, or cursor pointing devices like a mouse. The user input device 16 may also be used to select operating modes or mode annotations. Activity on the user input device 16 is typically sensed by the data processor 12 by monitoring interrupts, and such techniques are well known to those skilled in the art and therefore are not described herein. The apparatus 10 may also include an indicator 18 for indicating information about acquired data as well as for indicating information about selected operating modes and selected annotations, as will be further explained below. The indicator 18 may be formed from any device capable of providing visual or audible indications of data, operating modes or annotations. The visual indications may be in the form of visual alpha-numeric characters or symbols, while the audible indications may be tones, pulses or vibrations. Devices which may be used as the indicator 18 in the present invention include cathode ray tubes, vacuum fluorescent displays, liquid crystals, light emitting diodes, bells, whistles, horns, buzzers, loud speakers, and the like.

In addition to the user input device 16 and the indicator 18, the apparatus 10 includes a data storage device 20. The data storage device 20 may be a hard disk or solid state device such as non-volatile memory chip. Data stored on the data storage device 20 may also be acquired by the apparatus for the purpose of storing the data in association with a mode annotation on the device 20, if desired. As those skilled in the art will now appreciate, the data acquired by the apparatus 10 may come from any source, including the external data source device 14, the user input device 16, or the storage device 20.

Finally, in one embodiment of the apparatus 10, the apparatus 10 may be provided with one or more physical sensors, such as 22a and 22b, and one or more logical sensors, such as 24a and 24b. The physical 22a, 22b and logical 24a, 24b sensors communicate information about the apparatus' operating environment to the data processor 20. Physical sensors 22a, 22b that can be used in the present invention are any hardware components that can measure a physical parameter of the apparatus' operating environment. For example, a physical sensor may be a photo diode that can sense a physical parameter or property such as the ambient light. The physical sensor may be a transducer sensitive to ambient sounds. The physical sensor may be a thermistor or thermocouple sensitive to the ambient temperature. The physical sensor may be a device which can sense acceleration or deceleration, velocity, or altitude, to name a few others. Logical sensors 24a, 24b that can be used in the present invention are any devices which can gather information, such as time or position data, from a host or from an internal data source. For example, a logical sensor 24a, 24b may be part of a global positioning system receiver (GPS) which obtains data from a series of satellite hosts to determine global position and/or time of day for the apparatus. The logical sensors 24a, 24b may be part of the receiver circuit of a mobile phone which is adapted to obtain data communicated from one or more cells in a mobile telephone system to determine position or time of day for the apparatus. The logical sensor may be an internal clock or calendar associated with the apparatus 10.

By relying upon inputs from physical sensors 22a, 22b, logical sensors 24a, 24b or a combination of inputs from an array of physical and logical sensors, the data processor 20 of the apparatus 10, if provided with suitable programming instructions, can make determinations about the operating environment that the apparatus 10 is in. More particularly, if an array of physical and logical sensors, such as 22a, 22b, 24a and 24b, are utilized, the inputs of the various sensors employed can be correlated, and based upon such correlations, determinations about the operating environment can be made. The determinations about the operating environment can be used to select different operating modes for the apparatus 10 which are suitable for the determined operating environment. The selected operating mode is used to select a corresponding annotation as will be further described below.

Figure 2:
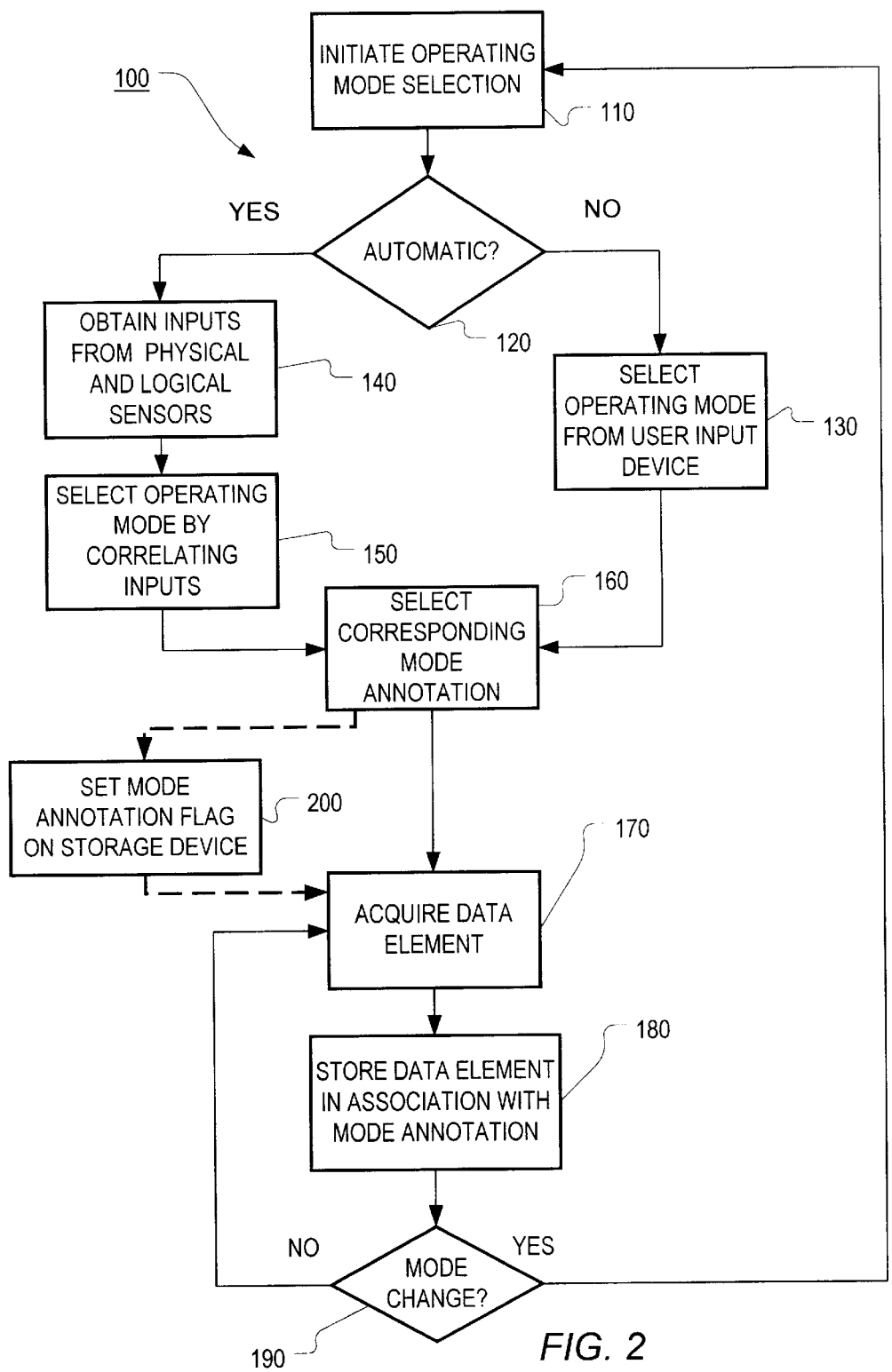
FIG. 2 is a flow diagram illustrating a data acquisition, annotation and storage method according to the present invention.

The above described apparatus 10 may be used to acquire and store data in association with the annotation which then permits the stored data to be recalled according to an associated annotation. An embodiment of the method is illustrated in the flow diagram of FIG. 2. Referring to FIG. 2, the method 100 begins by initiating the mode selection routine (block 110). At this stage, the method determines (block 120) whether the mode selection is automatic or manual. If manual, the mode is selected (block 130) by the user through entries made with the user input device 16. If automatic, the apparatus 10 obtains (block 140) inputs from one or more of the associated physical sensors, such as 22*a* and 22*b*, one or more of the logical sensors, such as 24*a* and 24*b*, or an array of selected physical and logical sensors. The inputs from the sensors provide information regarding the apparatus' operating environment. Based upon the physical and logical sensor inputs, which may be correlated in the case where more than one sensor or sensor type is used, the operating mode which is best suited for the apparatus' operating environment, as previously indicated by user preferences, is selected (block 150). Once the operating mode is selected, an operating mode annotation is selected (block 160) which is indicative of the selected operating mode. While the apparatus 10 is operated in the selected operating mode, whenever the apparatus 10 acquires a data element (block 170) from the external data source device 14, the user input device 16 or the data storage device 20, the acquired data element is associated with a mode annotation and stored (block 180) on the storage device 20. Because the stored data element is associated with the mode annotation, it can be recalled later from the storage device 20 based upon whether its mode annotation matches the mode annotation in the user's recall query, and then displayed on the indicator 18, if desired.

From time to time a user may wish to change the operating mode of the device. Accordingly, the apparatus tests (block 190) whether a mode change is desired. If no mode change is desired, the apparatus returns to the data acquisition, association and storage routine steps described above (blocks 170 through 180). If a mode change is desired, then the method returns to initiate operating mode selection step (block 110).

Figures 3A, 3B:
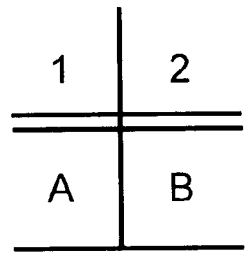
FIG. 3A is a diagram illustrating the relation between the state of a physical sensor and a selected operating mode and corresponding mode annotation.
FIG. 3B is a data structure diagram for data acquired with automatic mode selection based upon an input from an embodiment of the apparatus employing only a physical sensor.

FIG. 3A is a state diagram, illustrating a relationship between the state of a physical sensor, such as 22*a*, and the selected operating mode of the apparatus 10 when the operating mode is selected automatically on the basis of input from a single physical sensor. For example, the physical sensor may be a photo diode light sensor which can sense ambient light and dark conditions, the thresholds having been previously defined. If state 1 of the physical sensor is associated with light conditions and state 2 is associated with dark conditions, when light conditions are sensed (state 1), operating mode "A" is selected. When dark conditions are sensed (state 2), operating mode "B" is selected. In operating mode "A", the indicator 18 may be operated so as to be brighter to overcome the ambient light conditions. In operating mode "B", the indicator 18 may be dimmed so as not to appear too harsh in the dark conditions.

FIG. 3B illustrates several acquired data elements 30*a* through 30*h* and their associated annotations. Based on the associated annotations, if the user wishes to recall data elements acquired in the "A" operating mode corresponding to the light conditions sensed at the time of acquisition, data elements 30*a*, 30*b* and 30*g* will be recalled. Likewise, based on the associated annotations, if the user wishes to recall elements acquired in the "B" operating mode corresponding to dark conditions sensed at the time of acquisition, data elements 30*c* through 30*f* and 30*h* will be recalled.

Figures 4A, 4B:
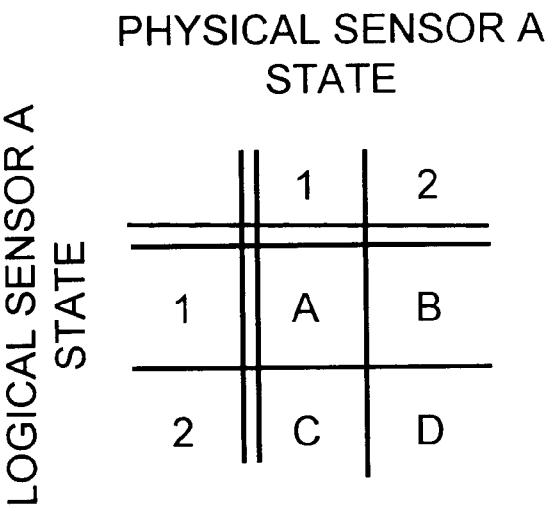
FIG. 4A is a diagram correlating several states of a physical and logical sensor into different operating modes and mode annotations.
FIG. 4B is a data structure diagram for streams of data elements acquired with automatic mode selection based upon correlated inputs from a physical and logical sensor, each of the data elements has its own mode annotation associated therewith.

FIG. 4A is a state diagram, illustrating a correlation between the state of a physical sensor such as 22*a*, the state of a logical sensor such as 24*a*, and predetermined operating modes. Like the above described example, the physical sensor 22*a* may be a photo diode light sensor which can sense ambient light and dark conditions, having previously defined thresholds. State "1" of the physical sensor is associated with light conditions and state "2" is associated with dark conditions. The logical sensor may be a time of day input from a cellular host or from an internal clock. State "1" of the logical sensor may be the time from 0:00 to 11:59 and state "2" of the logical sensor may be the time from 12:00 to 23:59. Referring to the diagram of FIG. 4A, when the physical sensor senses light (state 1) and the logical sensor senses that the time is between 0:00 and 11:59 (state 1), the apparatus 10 may select operating mode "A", as previously defined by the user. In the "A" operating mode, the indicator 18 of the apparatus 10 may be driven so as to be bright, loud, or both, for example, because the conditions indicate an active daytime state. All data acquired under this operating mode is associated with an annotation, such as "A", corresponding to this "A" operating mode. Likewise, when the physical sensor senses darkness (state 2) and the logical sensor senses that the time is between 12:00 and 23:59 (state 2), the apparatus 10 may select predetermined operating mode "D", which may cause the indicators 18 to be driven dim, quiet, or both, because the conditions may indicate a passive nighttime state. All data acquired under this operating mode is associated with an annotation, such as "D", corresponding to this selected operating mode "D".

FIG. 4B illustrates how several acquired data elements 40*a* through 40*h*, may be stored on storage device 20 so as to be associated with mode annotations. As shown in FIG. 4B, data elements 40*a* and 40*f* are acquired when the apparatus 10 is operating in the "A" operating mode corresponding to an environment of light conditions with a time between 0:00 and 11:59. Each is stored in association with its own mode annotation on the storage device. Based on the associated annotations, if the user wishes to recall data elements acquired in the "A" operating mode, data elements 40*a* and 40*f* will be recalled because they are associated with "A" mode annotations. Similarly, based on each of the data elements associated annotations, if the user wishes to recall elements acquired while the apparatus 10 was operating in the "D" operating mode corresponding to dark conditions and a time between 12:00 and 23:59, data elements 40*d* and 40*h* will be recalled. Because each data element is stored so as to be associated with its own mode annotation, duplicate mode annotations may be stored on the storage device 20, and therefore, may needlessly take up storage space on the storage device.

Figure 4C:
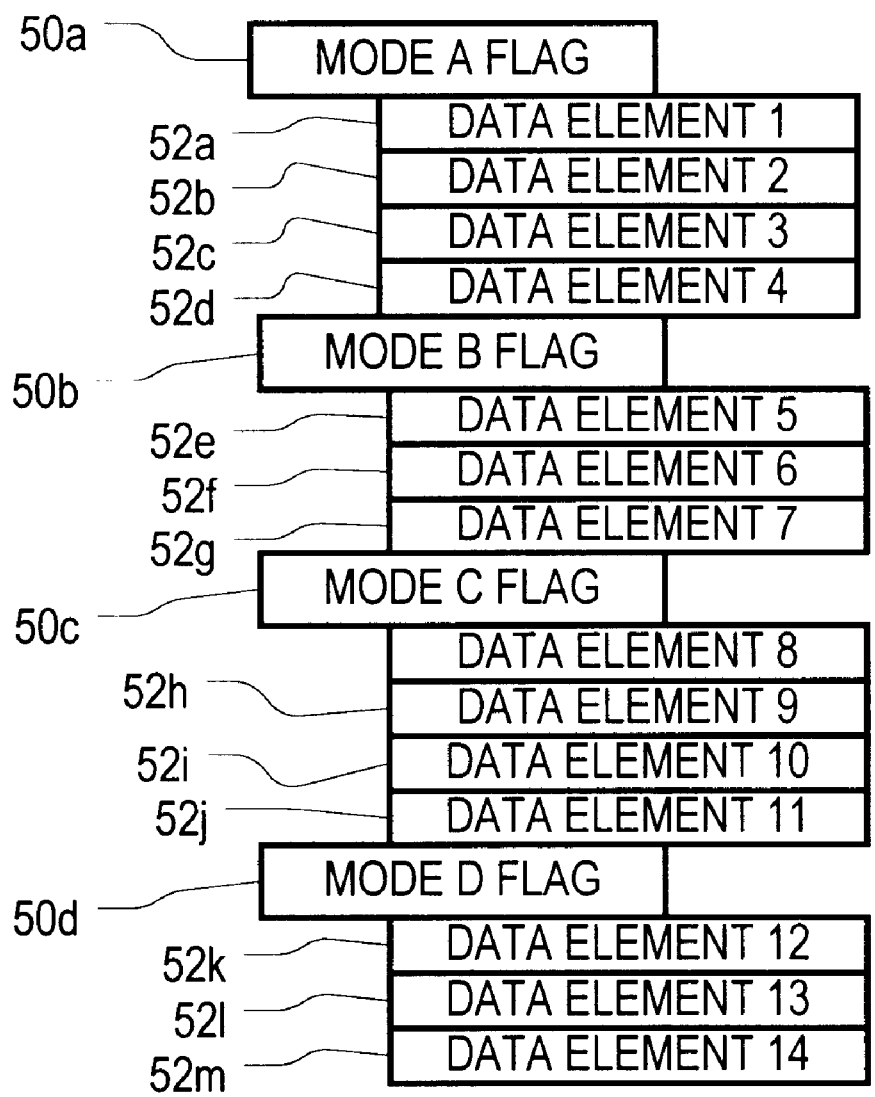
FIG. 4C is a data structure diagram for streams of data acquired with automatic mode selection based upon correlated inputs from a physical and logical sensor, and streams of data elements are associated with mode annotation flags.

To reduce the amount of storage space taken up by the storage of duplicate mode annotations as shown in FIG. 4B, the apparatus 10 may be configured so as to store mode (block 200) annotation flags on the storage device 20 only after an operating mode is selected (block 160). Then each data element acquired (block 170) thereafter under the same operating mode is associated with the same mode annotation flag. For example, referring to FIG. 4C, a mode annotation flag 50*a* is stored (block 200) on the storage device 20 after the selection of mode "A". The stream of data elements 1 through 5 (52*a* through 52*d*) acquired by the apparatus 10 are stored on the storage device 20 following the mode "A" annotation flag 50*a*. The stream of data elements which follow a mode annotation flag and which are stored before a new annotation flag is stored are associated with the previously stored mode annotation flag. When a new mode is selected (block 130 or 150), mode "B", either from a previously existing mode or a newly created mode, and a new mode annotation is selected (block 160) to indicate operating mode "B", a new mode annotation flag 50*b* is stored (block 200) on the storage device 20. The stream of data, such as data elements 5 through 7 (52e through 52g) acquired under operating mode "B" are stored on the storage device 20 following the mode "B" annotation flag 50b. Likewise, the stream of data elements, such as data elements 8 through 11 (52h through 52j), following the mode "C" annotation flag 50c are associated with the mode "C" annotation flag 50c. Following the above described system, the stream of data elements 12 through 14 (52k through 52m) are associated with the mode "D" annotation flag 50d.

Those skilled in the art will now appreciate that data which is acquired passively by the apparatus 10, which may have multiple different operating modes, may be efficiently recalled based upon an annotation relating to the operating mode currently running when the data was acquired. With the method and apparatus of the present invention, the data can be automatically associated with mode annotations whenever an operating mode is selected.

Although the present invention has been described with respect to particular embodiments of the method and apparatus for acquiring, annotating and storing data, it will be understood that other embodiments of the method and apparatus may be made without departing from the spirit and scope of the present invention. Hence, the present invention is deemed limited only by the appended claims and the reasonable interpretation thereof.

What is claimed is:

1. A method for acquiring and storing data so as to be associated with a mode annotation with a data acquisition apparatus having a plurality of predetermined operating modes for later recall according to associated annotations, the method comprising the steps of:
   (a) providing a data acquisition apparatus having a plurality of operating modes and a means for storing an acquired data element;
   (b) selecting one of the plurality of operating modes;
   (c) selecting a mode annotation which is indicative of the selected operating mode;
   (d) operating the apparatus in the selected operating mode;
   (e) acquiring a data element with the data acquisition apparatus operating in the selected operating mode; and
   (f) storing the acquired data element so as to be associated with the selected mode annotation on the storing means,
   wherein a plurality of mode annotations corresponds to the plurality of operating modes.

2. The method of claim 1, wherein the data acquisition apparatus has a user input means, and wherein the operating mode selected in step (b) is selected through interaction with the user input means.

3. The method of claim 2, wherein the mode annotation selected in step (c) is selected automatically in response to the operating mode selected in step (b).

4. The method of claim 1, wherein the data acquisition apparatus has a physical sensor adapted to sense a physical condition in the apparatus' operating environment, wherein the operating mode selected in step (b) is selected in response to the physical condition sensed by the physical sensor, and wherein the mode annotation selected in step (c) is selected automatically in response to the operating mode selected in step (b).

5. The method of claim 1, wherein the data acquisition apparatus has a logical sensor adapted to sense a logical condition, wherein the predetermined operating mode selected in step (b) is selected in response to the logical condition sensed by the logical sensor, and wherein the mode annotation selected in step (c) is selected automatically in response to the operating mode selected in step (b).

6. The method of claim 5, wherein the logical condition sensed is time of day.

7. The method of claim 1, wherein the data acquisition apparatus has a physical sensor adapted to sense a physical condition and a logical sensor adapted to sense a logical condition, wherein the operating mode selected in step (b) is selected in response to the physical condition and the logical condition sensed by the physical and logical sensors, and wherein the mode annotation selected in step (c) is selected automatically in response to the operating mode selected in step (b).

8. The method of claim 7, wherein the data acquisition apparatus has a user input means, wherein the operating mode selected in step (b) is selected through interaction with the user input means and wherein the second operating mode selected in step (g) is selected through interaction with the user input means.

9. The method of claim 7, wherein the mode annotation selected in step (c) is selected automatically in response to the operating mode selected in step (b) and wherein the second mode annotation selected in step (h) is selected automatically in response to the second operating mode selected in step (g).

10. The method of claim 7, wherein the data acquisition apparatus has a physical sensor adapted to sense a physical condition in the apparatus' operating environment, wherein the operating mode selected in step (b) is selected in response to a physical condition sensed by the physical sensor, wherein the mode annotation selected in step (c) is selected automatically in response to the operating mode selected in step (b), wherein the second operating mode selected in step (g) is selected in response to a physical condition sensed by the physical sensor, and wherein the second mode annotation selected in step (h) is selected automatically in response to the second operating mode selected in step (g).

11. The method of claim 10, wherein the logical condition sensed is time of day.

12. The method of claim 7, wherein the data acquisition apparatus has a logical sensor adapted to sense a logical condition in the apparatus' operating environment, wherein the operating mode selected in step (b) is selected in response to a logical condition sensed by the logical sensor, wherein the mode annotation selected in step (c) is selected automatically in response to the operating mode selected in step (b), wherein the second operating mode selected in step (g) is selected in response to a logical condition sensed by the logical sensor, and wherein the second mode annotation selected in step (h) is selected automatically in response to the second operating mode selected in step (g).

13. The method of claim 7, wherein the data acquisition apparatus has a physical sensor adapted to sense a physical condition and a logical sensor adapted to sense a logical condition, wherein the operating mode selected in step (b) is selected in response to a physical condition and a logical condition sensed by the physical and logical sensors, wherein the mode annotation selected in step (c) is selected automatically in response to the operating mode selected in step (b), wherein the second operating mode selected in step (g) is selected in response to a physical condition and a logical condition sensed by the physical and logical sensors, and wherein the mode annotation selected in step (h) is selected automatically in response to the operating mode selected in step (g).

14. The method of claim 1, wherein the method further comprises the steps of:

(g) selecting a second operating mode from the plurality of operating modes;

(h) selecting a second mode annotation which is indicative of the selected second operating mode;

(i) operating the data acquisition apparatus in the selected second operating mode;

(j) acquiring a second data element with the data acquisition apparatus operating in the selected second operating mode; and (k) storing the acquired second data element so as to be associated with the selected second mode annotation on the storing means.

15. A method for acquiring and storing data so as to be associated with a mode annotation with a data acquisition apparatus having a plurality of predetermined operating modes for later recall according to associated annotations, the method comprising the steps of:

(a) providing a data acquisition apparatus having a plurality of operating modes and a means for storing an acquired data element;

(b) selecting one of the plurality of operating modes, (c) selecting a mode annotation which is indicative of the selected operating mode;

(d) storing a mode annotation flag on the storage device corresponding to the selected mode annotation;

(e) operating the apparatus in the selected operating mode;

(f) acquiring a data element with the data acquisition apparatus operating in the selected operating mode; and (g) storing the acquired data element so as to be associated with the stored annotation flag on the storing means, wherein a plurality of mode annotations corresponds to the plurality of operating modes.

16. The method of claim 15, wherein the data acquisition apparatus has a user input means, and wherein the operating mode selected in step (b) is selected through interaction with the user input means.

17. The method of claim 16, wherein the mode annotation selected in step (c) is selected automatically in response to the operating mode selected in step (b).

18. The method of claim 15, wherein the data acquisition apparatus has a physical sensor adapted to sense a physical condition in the apparatus' operating environment, wherein the operating mode selected in step (b) is selected in response to the physical condition sensed by the physical sensor, and wherein the mode annotation selected in step (c) is selected automatically in response to the operating mode selected in step (b).

19. The method of claim 15, wherein the data acquisition apparatus has a logical sensor adapted to sense a logical condition, wherein the predetermined operating mode selected in step (b) is selected in response to the logical condition sensed by the logical sensor, and wherein the mode annotation selected in step (c) is selected automatically in response to the operating mode selected in step (b).

20. The method of claim 19, wherein the logical condition sensed is time of day.

21. The method of claim 15, wherein the data acquisition apparatus has a physical sensor adapted to sense a physical condition and a logical sensor adapted to sense a logical condition, wherein the operating mode selected in step (b) is selected in response to the physical condition and the logical condition sensed by the physical and logical sensors, and wherein the mode annotation selected in step (c) is selected automatically in response to the operating mode selected in step (b).

22. The method of claim 15, wherein the method further comprises the steps of:

(h) selecting a second operating mode from the plurality of operating modes;

(i) selecting a second mode annotation which is indicative of the selected second operating mode;

(j) storing a second mode annotation flag on the storage device corresponding to the selected second mode annotation;

(k) operating the data acquisition apparatus in the selected second operating mode;

(l) acquiring a second data element with the data acquisition apparatus operating in the selected second operating mode; and (m) storing the acquired second data element so as to be associated with the second mode annotation flag on the storing means.

23. The method of claim 22, wherein the data acquisition apparatus has a user input means, wherein the operating mode selected in step (b) is selected through interaction with the user input means and wherein the second operating mode selected in step (g) is selected through interaction with the user input means.

24. The method of claim 22, wherein the mode annotation selected in step (c) is selected automatically in response to the operating mode selected in step (b) and wherein the second mode annotation selected in step (i) is selected automatically in response to the second operating mode selected in step (h).

25. The method of claim 22, wherein the data acquisition apparatus has a physical sensor adapted to sense a physical condition in the apparatus' operating environment, wherein the operating mode selected in step (b) is selected in response to a physical condition sensed by the physical sensor, wherein the mode annotation selected in step (c) is selected automatically in response to the operating mode selected in step (b), wherein the second operating mode selected in step (h) is selected in response to a physical condition sensed by the physical sensor, and wherein the second mode annotation selected in step (i) is selected automatically in response to the second operating mode selected in step (h).

26. The method of claim 22, wherein the data acquisition apparatus has a logical sensor adapted to sense a logical condition in the apparatus' operating environment, wherein the operating mode selected in step (b) is selected in response to a logical condition sensed by the logical sensor, wherein the mode annotation selected in step (c) is selected automatically in response to the operating mode selected in step (b), wherein the second operating mode selected in step (h) is selected in response to a logical condition sensed by the logical sensor, and wherein the second mode annotation selected in step (i) is selected automatically in response to the second operating mode selected in step (h).

27. The method of claim 26, wherein the logical condition sensed is time of day.

28. The method of claim 22, wherein the data acquisition apparatus has a physical sensor adapted to sense a physical condition and a logical sensor adapted to sense a logical condition, wherein the operating mode selected in step (b) is selected in response to a physical condition and a logical condition sensed by the physical and logical sensors, wherein the mode annotation selected in step (c) is selected automatically in response to the operating mode selected in step (b), wherein the second operating mode selected in step (h) is selected in response to a physical condition and a logical condition sensed by the physical and logical sensors, and wherein the mode annotation selected in step (i) is selected automatically in response to the operating mode selected in step (h).

29. A data acquisition apparatus, having a plurality of operating modes for acquiring, annotating and storing data for later recall according to stored annotations, the apparatus comprising:

means for selecting one of the plurality of operating modes;

means for selecting a mode annotation which is indicative of the selected operating mode;

means for operating the apparatus in the selected operating mode;

means for acquiring a data element with the data acquisition apparatus operating in the selected operating mode; and means for storing the acquired data element so as to be associated with the selected mode annotation on the storing means, wherein a plurality of mode annotations corresponds to the plurality of operating modes.

30. The apparatus of claim 29, wherein the means for selecting the operating mode is a user input means.

31. The apparatus of claim 29, wherein the means for selecting the mode annotation selects a mode annotation in response to the selected operating mode.

32. The apparatus of claim 29, wherein the data acquisition apparatus has a physical sensor adapted to sense a physical condition in the apparatus' operating environment, wherein the means for selecting the operating mode selects an operating mode in response to physical conditions sensed by the physical sensor, and wherein the means for selecting a mode annotation selects a mode annotation in response to the selected operating mode.

33. The apparatus of claim 29, wherein the data acquisition apparatus has a logical sensor adapted to sense a logical condition in the apparatus' operating environment, wherein the means for selecting the operating mode selects an operating mode in response to logical conditions sensed by the logical sensor, and wherein the means for selecting a mode annotation selects a mode annotation in response to the selected operating mode.

34. The apparatus of claim 29, wherein the data acquisition apparatus has a logical sensor adapted to sense a logical condition in the apparatus' operating environment and a physical sensor adapted to sense a physical condition in the apparatus' operating environment, wherein the means for selecting the operating mode selects an operating mode in response to the logical and physical conditions sensed by the logical and physical sensors, and wherein the means for selecting a mode annotation selects a mode annotation in response to the selected operating mode.

* * * * *